United States Patent
Xia et al.

(10) Patent No.: US 12,019,715 B2
(45) Date of Patent: Jun. 25, 2024

(54) SYSTEMS AND METHODS FOR IDENTIFYING TARGET OBJECT

(71) Applicant: ZHEJIANG DAHUA TECHNOLOGY CO., LTD., Zhejiang (CN)

(72) Inventors: Ruobin Xia, Hangzhou (CN); Chuang Gao, Hangzhou (CN)

(73) Assignee: ZHEJIANG DAHUA TECHNOLOGY CO., LTD., Hangzhou (CN)

( * ) Notice: Subject to any disclaimer, the term of this patent is extended or adjusted under 35 U.S.C. 154(b) by 531 days.

(21) Appl. No.: 17/320,261

(22) Filed: May 14, 2021

(65) Prior Publication Data

US 2021/0271936 A1    Sep. 2, 2021

Related U.S. Application Data

(63) Continuation of application No. PCT/CN2019/093043, filed on Jun. 26, 2019.

(30) Foreign Application Priority Data

Nov. 14, 2018 (CN) .......................... 201811353879.2

(51) Int. Cl.
*G06F 18/25* (2023.01)
*H01Q 25/00* (2006.01)

(52) U.S. Cl.
CPC .......... *G06F 18/251* (2023.01); *H01Q 25/00* (2013.01); *G06V 2201/07* (2022.01)

(58) Field of Classification Search
CPC ... G06F 18/251; H01Q 25/00; G06V 2201/07
(Continued)

(56) References Cited

U.S. PATENT DOCUMENTS 8,947,528 B2    2/2015  Hinman et al.
10,455,156 B2 *  10/2019  Lagnado ................ H04N 23/60
(Continued)

FOREIGN PATENT DOCUMENTS

CN      205232319 U    5/2016
CN      106878666 A    6/2017
(Continued)

OTHER PUBLICATIONS

International Search Report in PCT/CN2019/093043 dated Sep. 30, 2019, 4 Pages.
(Continued)

*Primary Examiner* — Kerri L McNally
(74) *Attorney, Agent, or Firm* — METIS IP LLC

(57) ABSTRACT

The present disclosure relates to systems and methods for identifying a target object. The method may include receiving, from a first antenna, a first signal associated with at least one candidate object and receiving, from a second antenna, a second signal associated with the at least one candidate object. The first antenna may be associated with a first acquisition region. The second antenna may be associated with a second acquisition region that is different from the first acquisition region. The method may further include identifying a target object located in a target region from the at least one candidate object by comparing a first parameter determined from the first signal with a second parameter determined from the second signal.

18 Claims, 10 Drawing Sheets

(58) Field of Classification Search
USPC .......................................................... 340/552
See application file for complete search history.

(56) References Cited

U.S. PATENT DOCUMENTS

| | | |
|---|---|---|
| 2013/0314211 A1 | 11/2013 | Hinman et al. |
| 2014/0085526 A1 | 3/2014 | Takahashi et al. |
| 2014/0320723 A1* | 10/2014 | Shirono ................. H04N 23/63 |
| | | 348/333.05 |
| 2016/0261793 A1* | 9/2016 | Sivan .................... G06V 40/166 |
| 2016/0267760 A1 | 9/2016 | Trani |
| 2017/0115373 A1* | 4/2017 | Lindstrom ................. G06T 7/70 |
| 2017/0255820 A1* | 9/2017 | Liu ........................... H04Q 5/22 |
| 2018/0261917 A1* | 9/2018 | Lamontagne .......... H01Q 21/30 |
| 2019/0007621 A1 | 1/2019 | Lagnado et al. |
| 2019/0026096 A1* | 1/2019 | Matsui .................... H04L 67/34 |

FOREIGN PATENT DOCUMENTS

| | | |
|---|---|---|
| EP | 2892268 A1 | 7/2015 |
| EP | 2892268 B1 | 3/2018 |
| WO | 2017096761 A1 | 6/2017 |
| WO | 2020098283 A1 | 5/2020 |

OTHER PUBLICATIONS

Written Opinion in PCT/CN2019/093043 dated Sep. 30, 2019, 6 Pages.
First Office Action in Chinese Application No. 201811353879.2 dated Dec. 13, 2019, 14 pages.
The Extended European Search Report in European Application No. 19884076.1 dated Jan. 5, 2022, 8 pages.

* cited by examiner

SYSTEMS AND METHODS FOR IDENTIFYING TARGET OBJECT

CROSS-REFERENCE TO RELATED APPLICATIONS

This application is a continuation of International Application No. PCT/CN2019/093043, filed on Jun. 26, 2019, designating the United States of America, which claims priority of Chinese Patent Application No. 201811353879.2 filed on Nov. 14, 2018, the entire contents of each of which are incorporated herein by reference in their entirety.

TECHNICAL FIELD

The present disclosure generally relates to security monitoring technology, and in particular, to systems and methods for identifying a target object located in a target region.

BACKGROUND

Security monitoring technology is a technology that records and displays real-time images of a monitored area by using video detection technology. In the existing security monitoring technology, an antenna can be jointly used with a camera to detect a terminal device (e.g., a mobile phone) by detecting a media access control (MAC) address of the terminal device. When the camera and the antenna are jointly used, it is expected that an object (e.g., a terminal device) detected by the antenna is matched with a corresponding object detected by the camera (i.e., objects located in a capture area of the camera are identified and monitored) and objects outside the capture area of the camera are not monitored. Therefore, it is desirable to provide systems and methods for identifying object(s) located in the capture area accurately and efficiently.

SUMMARY

An aspect of the present disclosure relates to a method for determining an object in a capture area. The method may include receiving a first signal of at least one candidate object through a first antenna. An acquisition region of the first antenna may include a capture area and a non-capture area of a camera. The method may further include, if a second signal of the at least one candidate object is received through a second antenna, determining an object in the capture area from the at least one candidate object based on a receiving parameter of the first signal and a receiving parameter of the second signal. An acquisition region of the second antenna may include the non-capture area. A receiving parameter of the second antenna may be different from a receiving parameter of the first antenna.

In some embodiments, the receiving parameter may include at least one of a received signal power, a received signal amplitude, a received signal intensity, a signal arrival angle, and/or a signal arrival phase.

In some embodiments, a propagation of a main lobe of the first antenna may be directed towards the capture area and a propagation of non-main lobes of the first antenna may be directed towards the non-capture area. A receiving parameter of the main lobe, a receiving parameter of the non-main lobes, and the receiving parameter of the second antenna may be different from each other.

In some embodiments, the receiving parameter may be a received power of a signal, and when a received power of the second antenna is less than a received power of the main lobe and larger than a received power of the non-main lobe, the determining an object in the capture area from the at least one candidate object based on a receiving parameter of the first signal and a receiving parameter of the second signal may include: for each of the at least one candidate object, comparing a received power of the first signal of the candidate object with a received power of the second signal of the candidate object, and if the received power of the first signal of the candidate object is larger than the received power of the second signal of the candidate object, determining that the candidate object is an object in the capture area, until all the objects in the capture area have been determined from the at least one candidate object.

In some embodiments, the method may further include, if no second signal of the at least one candidate object is received through the second antenna, determining the at least one candidate object as at least one object in the capture area.

In some embodiments, the first antenna may be a directional antenna and the second antenna may be an omnidirectional antenna.

Another aspect of the present disclosure relates to a system for determining an object in a capture area. The system may include a first antenna, a second antenna, and a camera. When a first signal of at least one candidate object is received through the first antenna, if a second signal of the at least one candidate object is received through the second antenna, an object in the capture area may be determined from the at least one candidate object based on a receiving parameter of the first signal and a receiving parameter of the second signal. An acquisition region of the first antenna may include a capture area and a non-capture area of a camera. An acquisition region of the second antenna may include the non-capture area. A receiving parameter of the first antenna may be different from a receiving parameter of the second antenna.

In some embodiments, a propagation of a main lobe of the first antenna may be directed towards the capture area and a propagation of non-main lobes of the first antenna may be directed towards the non-capture area. A receiving parameter of the main lobe, a receiving parameter of the non-main lobes, and the receiving parameter of the second antenna may be different from each other.

In some embodiments, the receiving parameter may include at least one of a received signal power, a received signal amplitude, a received signal intensity, a signal arrival angle, and/or a signal arrival phase.

A further aspect of the present disclosure relates to a device for determining an object in a capture area. The device may include the first antenna, the second antenna, and the camera described above.

A still further aspect of the present disclosure relates to a system for identifying a target object. The system may include a storage device to store a set of instructions and a processor communicatively coupled to the storage device. The processor may execute the set of instructions to receive, from a first antenna, a first signal associated with at least one candidate object; receive, from a second antenna, a second signal associated with the at least one candidate object; and identify a target object located in a target region from the at least one candidate object by comparing a first parameter determined from the first signal with a second parameter determined from the second signal. The first antenna may be associated with a first acquisition region and the second antenna may be associated with a second acquisition region that is different from the first acquisition region.

In some embodiments, the target region may correspond to a capture area of a camera.

In some embodiments, the first acquisition region may include the target region and a non-target region, and the second acquisition region may include the non-target region.

In some embodiments, the first antenna may include a main lobe and one or more non-main lobes, a propagation of the main lobe may be directed towards the target region and propagation of the one or more non-main lobes may be directed towards the non-target region.

In some embodiments, the first antenna may be associated with a first antenna parameter. The first antenna parameter may include a main lobe parameter corresponding to the main lobe and one or more non-main lobe parameters corresponding to the one or more non-main lobes. The second antenna may be associated with a second antenna parameter. The main lobe parameter, the one or more non-main lobe parameters, and the second antenna parameter may be different from each other.

In some embodiments, the first antenna parameter may include a first received power. The first received power may include a main lobe received power corresponding to the main lobe and a non-main lobe received power corresponding to the one or more non-main lobes. The second antenna parameter may include a second received power. The second received power may be less than the main lobe received power and larger than the non-main received power. To identify the target object located in the target region from the at least one candidate object by comparing the first parameter determined from the first signal with the second parameter determined from the second signal, the processor may, for each of the at least one candidate object, compare a first signal intensity of the first signal with a second signal intensity of the second signal. The processor may further, in response to determining that the first signal intensity may be greater than the second signal intensity, identify the candidate object as the target object located in the target region.

In some embodiments, the first parameter determined from the first signal may include at least one of a first signal power, a first signal amplitude, a first signal intensity, a first signal arrival angle, and/or a first signal arrival phase. The second parameter determined from the second signal may include at least one of a second signal power, a second signal amplitude, a second signal intensity, a second signal arrival angle, and/or a second signal arrival phase.

In some embodiments, the first antenna may be a directional antenna and the second antenna may be an omnidirectional antenna.

In some embodiments, the first signal and the second signal may include identification information associated with the at least one candidate object.

A still further aspect of the present disclosure relates to a method for identifying a target object. The method may be implemented on a computing device including at least one processor and at least one storage medium. The method may include receiving, from a first antenna, a first signal associated with at least one candidate object and receiving, from a second antenna, a second signal associated with the at least one candidate object. The first antenna may be associated with a first acquisition region. The second antenna may be associated with a second acquisition region that is different from the first acquisition region. The method may further include identifying a target object located in a target region from the at least one candidate object by comparing a first parameter determined from the first signal with a second parameter determined from the second signal.

In some embodiments, the target region may correspond to a capture area of a camera.

In some embodiments, the first acquisition region may include the target region and a non-target region, and the second acquisition region may include the non-target region.

In some embodiments, the first antenna may include a main lobe and one or more non-main lobes, a propagation of the main lobe may be directed towards the target region and propagation of the one or more non-main lobes may be directed towards the non-target region.

In some embodiments, the first antenna may be associated with a first antenna parameter. The first antenna parameter may include a main lobe parameter corresponding to the main lobe and one or more non-main lobe parameters corresponding to the one or more non-main lobes. The second antenna may be associated with a second antenna parameter. The main lobe parameter, the one or more non-main lobe parameters, and the second antenna parameter may be different from each other.

In some embodiments, the first antenna parameter may include a first received power. The first received power may include a main lobe received power corresponding to the main lobe and a non-main lobe received power corresponding to the one or more non-main lobes. The second antenna parameter may include a second received power. The second received power may be less than the main lobe received power and larger than the non-main received power. The identifying the target object located in the target region from the at least one candidate object by comparing the first parameter determined from the first signal with the second parameter determined from the second signal may include: for each of the at least one candidate object, comparing a first signal intensity of the first signal with a second signal intensity of the second signal and in response to determining that the first signal intensity may be greater than the second signal intensity, identifying the candidate object as the target object located in the target region.

In some embodiments, the first parameter determined from the first signal may include at least one of a first signal power, a first signal amplitude, a first signal intensity, a first signal arrival angle, and/or a first signal arrival phase. The second parameter determined from the second signal may include at least one of a second signal power, a second signal amplitude, a second signal intensity, a second signal arrival angle, and/or a second signal arrival phase.

In some embodiments, the first antenna may be a directional antenna and the second antenna may be an omnidirectional antenna.

In some embodiments, the first signal and the second signal may include identification information associated with the at least one candidate object.

A still further aspect of the present disclosure relates to a system for identifying a target object. The system may include a receiving module and an identification module. The receiving module may be configured to receive, from a first antenna, a first signal associated with at least one candidate object. The first antenna may be associated with a first acquisition region. The receiving module may be further configured to receive, from a second antenna, a second signal associated with the at least one candidate object. The second antenna may be associated with a second acquisition region that is different from the first acquisition region. The identification module may be configured to identify a target object located in a target region from the at least one candidate object by comparing a first parameter determined from the first signal with a second parameter determined from the second signal.

In some embodiments, the target region may correspond to a capture area of a camera.

In some embodiments, the first acquisition region may include the target region and a non-target region, and the second acquisition region may include the non-target region.

In some embodiments, the first antenna may include a main lobe and one or more non-main lobes, a propagation of the main lobe may be directed towards the target region and propagation of the one or more non-main lobes may be directed towards the non-target region.

In some embodiments, the first antenna may be associated with a first antenna parameter. The first antenna parameter may include a main lobe parameter corresponding to the main lobe and one or more non-main lobe parameters corresponding to the one or more non-main lobes. The second antenna may be associated with a second antenna parameter. The main lobe parameter, the one or more non-main lobe parameters, and the second antenna parameter may be different from each other.

In some embodiments, the first antenna parameter may include a first received power. The first received power may include a main lobe received power corresponding to the main lobe and a non-main lobe received power corresponding to the one or more non-main lobes. The second antenna parameter may include a second received power. The second received power may be less than the main lobe received power and larger than the non-main received power. To identify the target object located in the target region from the at least one candidate object by comparing the first parameter determined from the first signal with the second parameter determined from the second signal, the identification module may be further configured to: for each of the at least one candidate object, compare a first signal intensity of the first signal with a second signal intensity of the second signal and in response to determining that the first signal intensity may be greater than the second signal intensity, identify the candidate object as the target object located in the target region.

In some embodiments, the first parameter determined from the first signal may include at least one of a first signal power, a first signal amplitude, a first signal intensity, a first signal arrival angle, and/or a first signal arrival phase. The second parameter determined from the second signal may include at least one of a second signal power, a second signal amplitude, a second signal intensity, a second signal arrival angle, and/or a second signal arrival phase.

In some embodiments, the first antenna may be a directional antenna and the second antenna may be an omnidirectional antenna.

In some embodiments, the first signal and the second signal may include identification information associated with the at least one candidate object.

A still further aspect of the present disclosure relates to a non-transitory computer readable medium. The non-transitory computer readable medium may include executable instructions. When executed by at least one processor, the executable instructions may direct the at least one processor to perform a method. The method may include receiving, from a first antenna, a first signal associated with at least one candidate object and receiving, from a second antenna, a second signal associated with the at least one candidate object. The first antenna may be associated with a first acquisition region and the second antenna may be associated with a second acquisition region that is different from the first acquisition region. The method may further include identifying a target object located in a target region from the at least one candidate object by comparing a first parameter determined from the first signal with a second parameter determined from the second signal.

Additional features will be set forth in part in the description which follows, and in part will become apparent to those skilled in the art upon examination of the following and the accompanying drawings or may be learned by production or operation of the examples. The features of the present disclosure may be realized and attained by practice or use of various aspects of the methodologies, instrumentalities, and combinations set forth in the detailed examples discussed below.

BRIEF DESCRIPTION OF THE DRAWINGS

The present disclosure is further described in terms of exemplary embodiments. These exemplary embodiments are described in detail with reference to the drawings. These embodiments are non-limiting exemplary embodiments, in which like reference numerals represent similar structures throughout the several views of the drawings, and wherein.

DETAILED DESCRIPTION

Figure 1:
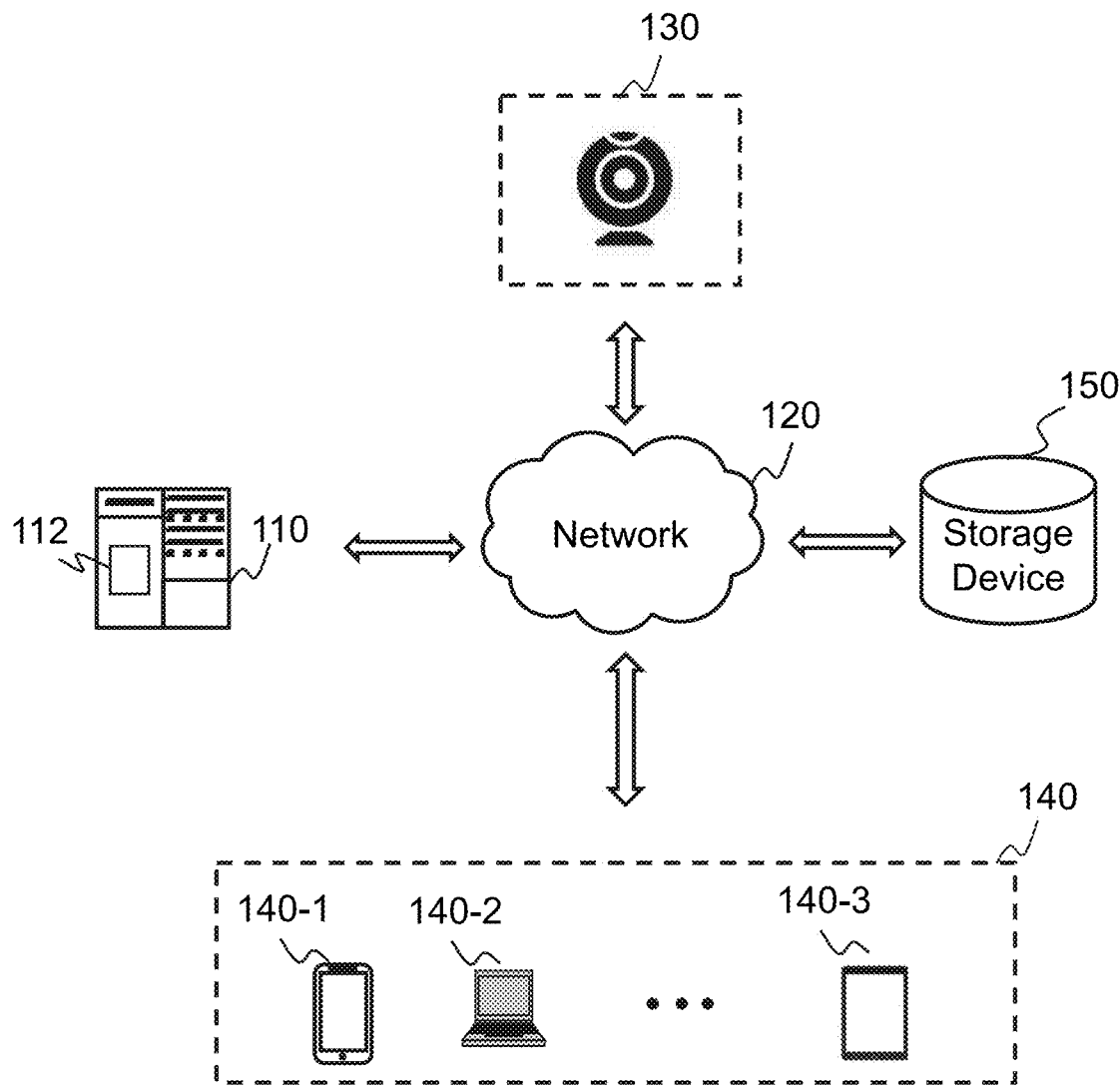
FIG. 1 is a schematic diagram illustrating an exemplary security monitoring system according to some embodiments of the present disclosure.

In the following detailed description, numerous specific details are set forth by way of examples in order to provide a thorough understanding of the relevant disclosure. However, it should be apparent to those skilled in the art that the present disclosure may be practiced without such details. In other instances, well-known methods, procedures, systems, components, and/or circuitry have been described at a relatively high-level, without detail, in order to avoid unnecessarily obscuring aspects of the present disclosure. Various modifications to the disclosed embodiments will be readily apparent to those skilled in the art, and the general principles defined herein may be applied to other embodiments and applications without departing from the spirit and scope of the present disclosure. Thus, the present disclosure is not limited to the embodiments shown, but to be accorded the widest scope consistent with the claims.

It will be understood that the term "system," "engine," "unit," "module," and/or "block" used herein are one method to distinguish different components, elements, parts, section or assembly of different level in ascending order. However, the terms may be displaced by other expression if they may achieve the same purpose.

Generally, the word "module," "unit," or "block," as used herein, refers to logic embodied in hardware or firmware, or to a collection of software instructions. A module, a unit, or a block described herein may be implemented as software and/or hardware and may be stored in any type of non-transitory computer-readable medium or other storage device. In some embodiments, a software module/unit/block may be compiled and linked into an executable program. It will be appreciated that software modules can be callable from other modules/units/blocks or from themselves, and/or may be invoked in response to detected events or interrupts. Software modules/units/blocks configured for execution on computing devices (e.g., processor 220 illustrated in FIG. 2) may be provided on a computer readable medium, such as a compact disc, a digital video disc, a flash drive, a magnetic disc, or any other tangible medium, or as a digital download (and can be originally stored in a compressed or installable format that needs installation, decompression, or decryption prior to execution). Such software code may be stored, partially or fully, on a storage device of the executing computing device, for execution by the computing device. Software instructions may be embedded in firmware, such as an EPROM. It will be further appreciated that hardware modules (or units or blocks) may be included in connected logic components, such as gates and flip-flops, and/or can be included in programmable units, such as programmable gate arrays or processors. The modules (or units or blocks) or computing device functionality described herein may be implemented as software modules (or units or blocks), but may be represented in hardware or firmware. In general, the modules (or units or blocks) described herein refer to logical modules (or units or blocks) that may be combined with other modules (or units or blocks) or divided into sub-modules (or sub-units or sub-blocks) despite their physical organization or storage.

It will be understood that when a unit, an engine, a module, or a block is referred to as being "on," "connected to," or "coupled to" another unit, engine, module, or block, it may be directly on, connected or coupled to, or communicate with the other unit, engine, module, or block, or an intervening unit, engine, module, or block may be present, unless the context clearly indicates otherwise. As used herein, the term "and/or" includes any and all combinations of one or more of the associated listed items.

The terminology used herein is for the purposes of describing particular examples and embodiments only and is not intended to be limiting. As used herein, the singular forms "a," "an," and "the" may be intended to include the plural forms as well, unless the context clearly indicates otherwise. It will be further understood that the terms "include" and/or "comprise," when used in this disclosure, specify the presence of integers, devices, behaviors, stated features, steps, elements, operations, and/or components, but do not exclude the presence or addition of one or more other integers, devices, behaviors, features, steps, elements, operations, components, and/or groups thereof.

In addition, it should be understood that in the description of the present disclosure, the terms "first", "second", or the like, are only used to distinguish the purpose of description, and cannot be interpreted as indicating or implying relative importance, nor can be understood as indicating or implying the order.

An aspect of the present disclosure relates to systems and methods for identifying a target object located in a target region. The systems may receive a first signal associated with at least one candidate object from a first antenna and a second signal associated with the at least one candidate object from a second antenna. A first acquisition region associated with the first antenna may include a target region which corresponds to a capture area of a camera and a non-target region; a second acquisition region associated with the second antenna may be different from the first acquisition region, for example, the second acquisition may include the non-target region and a portion of the target region. A first antenna parameter (e.g., a first received power) associated with the first antenna may be different from a second antenna parameter (e.g., a second received power) associated with the second antenna. Since the acquisition regions of the two antennas and the antenna parameters of the two antennas are different, for a specific candidate object, the first signal detected by the first antenna is different from the second signal detected by the second antenna. Further, the systems may identify one or more target objects located in the target region from the at least one candidate object based on a first parameter (e.g., a first signal intensity) determined from the first signal and a second parameter (e.g., a second signal intensity) determined from the second signal.

FIG. 1 is a schematic diagram illustrating an exemplary security monitoring system according to some embodiments of the present disclosure. As shown, the security monitoring system 100 may include a server 110, a network 120, an acquisition device 130, a user device 140, and a storage 150.

The server 110 may be a single server or a server group. The server group may be centralized or distributed (e.g., the server 110 may be a distributed system). In some embodiments, the server 110 may be local or remote. For example, the server 110 may access information and/or data stored in the acquisition device 130, the user device 140, and/or the storage 150 via the network 120. As another example, the server 110 may be directly connected to the acquisition device 130, the user device 140, and/or the storage 150 to access stored information and/or data. In some embodiments, the server 110 may be implemented on a cloud platform. Merely by way of example, the cloud platform may include a private cloud, a public cloud, a hybrid cloud, a community cloud, a distributed cloud, an inter-cloud, a multi-cloud, or the like, or any combination thereof. In some embodiments, the server 110 may be implemented on a computing device 200 including one or more components illustrated in FIG. 2 of the present disclosure.

In some embodiments, the server 110 may include a processing engines 112. The processing engine 112 may process information and/or data relating to security monitoring to perform one or more functions described in the present disclosure. For example, the processing engine 112 may identify a target object located in a target region from at least one candidate object based on a first signal associated with the at least one candidate object and a second signal associated with the at least one candidate object. In some embodiments, the processing engine 112 may include a central processing unit (CPU), an application-specific integrated circuit (ASIC), an application-specific instruction-set processor (ASIP), a graphics processing unit (GPU), a physics processing unit (PPU), a digital signal processor (DSP), a field programmable gate array (FPGA), a programmable logic device (PLD), a controller, a microcontroller unit, a reduced instruction-set computer (RISC), a microprocessor, or the like, or any combination thereof.

In some embodiment, the sever 110 may be unnecessary and all or part of the functions of the server 110 may be implemented by other components (e.g., the acquisition device 130, the user device 140) of the security monitoring system 100. For example, the processing engine 112 may be integrated in the acquisition device 130 or the user device 140 and the functions (e.g., identifying a target object) of the processing engine 112 may be implemented by the acquisition device 130 or the user device 140.

The network 120 may facilitate exchange of information and/or data for the security monitoring system 100. In some embodiments, one or more components (e.g., the server 110, the acquisition device 130, the user device 140, the storage 150) of the security monitoring system 100 may transmit information and/or data to another component(s) in the security monitoring system 100 via the network 120. For example, the server 110 may obtain data related to at least one candidate object from the acquisition device 130 via the network 120. In some embodiments, the network 120 may be any type of wired or wireless network, or combination thereof. Merely by way of example, the network 120 may include a cable network (e.g., a coaxial cable network), a wireline network, an optical fiber network, a telecommunications network, an intranet, an Internet, a local area network (LAN), a wide area network (WAN), a wireless local area network (WLAN), a metropolitan area network (MAN), a public telephone switched network (PSTN), a Bluetooth network, a ZigBee network, a near field communication (NFC) network, or the like, or any combination thereof.

The acquisition device 130 may be configured to acquire information and/or data associated with an object (e.g., a terminal device). In some embodiments, the acquisition device 130 may be jointly used with one or more antennas. The acquisition device 130 and the one or more antennas may be jointly configured to monitor an object located in a target region (e.g., an acquisition region of the acquisition device 130). In some embodiments, the acquisition device 130 may include a camera, an infrared sensor, a sound sensor, a position sensor, a pressure sensor, a radar, or the like, or any combination thereof. Take "camera" as an example, the camera may be jointly used with a first antenna and a second antenna; and the camera, the first antenna, and the second antenna may be jointly configured to monitor an object located in a capture area of the camera. In some embodiments, the camera may include a gun camera, a dome camera, an integrated camera, a monocular camera, a binocular camera, a multi-view camera, or the like, or any combination thereof. The antenna may include a directional antenna, an omnidirectional antenna, a dipole antenna, a monopole antenna, a loop antenna, or the like, or any combination thereof.

The user device 140 may be configured to receive information and/or data from the server 110, the acquisition device 130, and/or the storage device 150 via the network 120. For example, the user device 140 may receive information associated with a target object from the server 110. In some embodiments, the user device may provide a user interface via which a user may view information and/or input data and/or instructions to the security monitoring system 100. For example, the user may view identification information associated with a target object. In some embodiments, the user device 140 may include a mobile phone 140-1, a computer 140-2, a tablet computer 140-3, etc. In some embodiments, the user device 140 may include a display that can display or output information in a human-readable form, such as text, image, audio, video, graph, animation, or the like, or any combination thereof. The display of the user device 140 may include a cathode ray tube (CRT) display, a liquid crystal display (LCD), a light emitting diode (LED) display, a plasma display panel (PDP), a three dimensional (3D) display, or the like, or a combination thereof. In some embodiments, the user device 140 may be connected to one or more components (e.g., the server 110, the acquisition device 130, the storage 150) of the security monitoring system 100 via the network 120.

The storage 150 may be configured to store data and/or instructions. The data and/or instructions may be obtained from, for example, the server 110, the acquisition device 130, and/or any other component of the security monitoring system 100. In some embodiments, the storage 150 may store data and/or instructions that the server 110 may execute or use to perform exemplary methods described in the present disclosure. For example, the storage 150 may store signals associated with a plurality of objects to be processed. In some embodiments, the storage 150 may include a mass storage, a removable storage, a volatile read-and-write memory, a read-only memory (ROM), or the like, or any combination thereof. Exemplary mass storage may include a magnetic disk, an optical disk, a solid-state drives, etc. Exemplary removable storage may include a flash drive, a floppy disk, an optical disk, a memory card, a zip disk, a magnetic tape, etc. Exemplary volatile read-and-write memory may include a random access memory (RAM). Exemplary RAM may include a dynamic RAM (DRAM), a double date rate synchronous dynamic RAM (DDR SDRAM), a static RAM (SRAM), a thyristor RAM (T-RAM), and a zero-capacitor RAM (Z-RAM), etc. Exemplary ROM may include a mask ROM (MROM), a programmable ROM (PROM), an erasable programmable ROM (EPROM), an electrically erasable programmable ROM (EEPROM), a compact disk ROM (CD-ROM), and a digital versatile disk ROM, etc. In some embodiments, the storage 150 may be implemented on a cloud platform. Merely by way of example, the cloud platform may include a private cloud, a public cloud, a hybrid cloud, a community cloud, a distributed cloud, an inter-cloud, a multi-cloud, or the like, or any combination thereof.

In some embodiments, the storage 150 may be connected to the network 120 to communicate with one or more components (e.g., the server 110, the acquisition device 130, the user device 140) of the security monitoring system 100. One or more components of the security monitoring system 100 may access the data or instructions stored in the storage 150 via the network 120. In some embodiments, the storage 150 may be directly connected to or communicate with one or more components (e.g., the server 110, the acquisition device 130, the user device 140) of the security monitoring system 100. In some embodiments, the storage 150 may be part of another component of the security monitoring system 100, such as the server 110, the acquisition device 130, or the user device 140.

It should be noted that the application scenario illustrated in FIG. 1 is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure. For example, other than security monitoring, the system 100 may be applied to any data collection and processing scenario.

Figure 2:
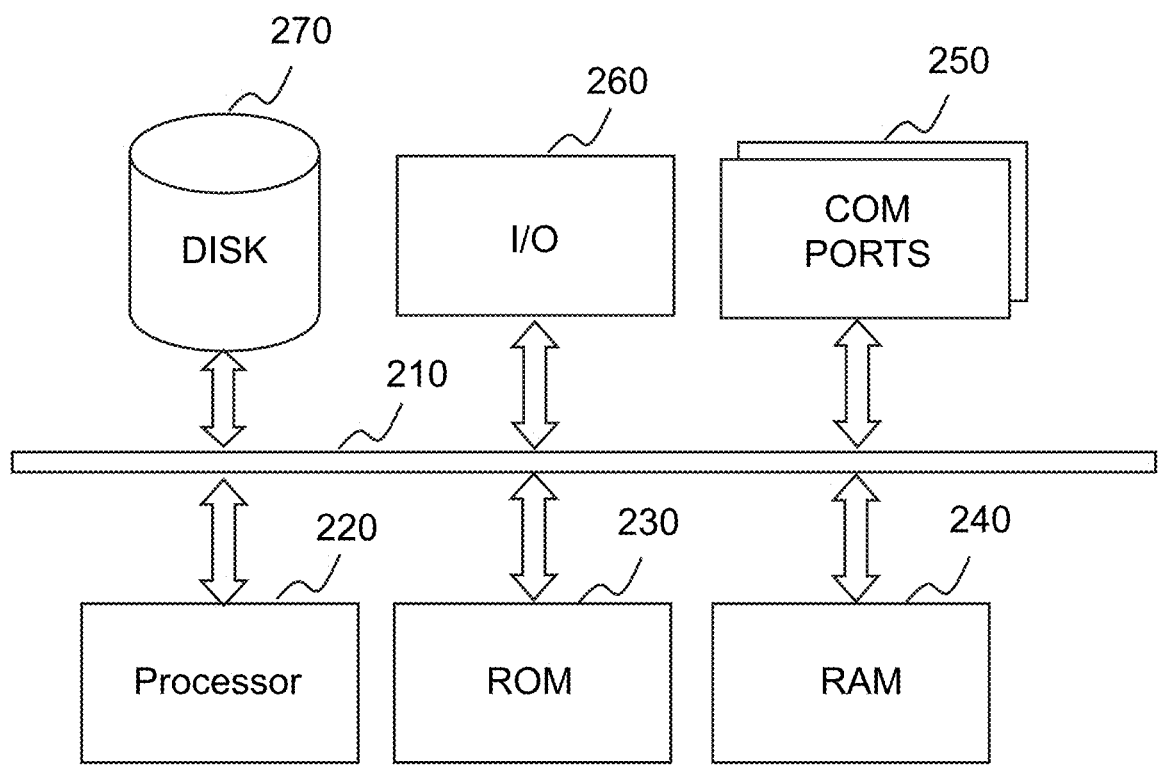
FIG. 2 is a schematic diagram illustrating exemplary hardware and/or software components of an exemplary computing device according to some embodiments of the present disclosure.

FIG. 2 is a schematic diagram illustrating exemplary hardware and/or software components of an exemplary computing device according to some embodiments of the present disclosure. In some embodiments, the server 110 may be implemented on the computing device 200 shown in FIG. 2. For example, the processing engine 112 may be implemented on the computing device 200 and configured to perform functions of the processing engine 112 disclosed in this disclosure.

The computing device 200 may be used to implement any component of the security monitoring system 100 as described herein. For example, the processing engine 112 may be implemented on the computing device 200, via its hardware, software program, firmware, or a combination thereof. Although only one such computer is shown, for convenience, the computer functions relating to image processing as described herein may be implemented in a distributed fashion on a number of similar platforms to distribute the processing load.

The computing device 200, for example, may include COM ports 250 connected to and from a network connected thereto to facilitate data communications. The computing device 200 may also include a processor (e.g., the processor 220), in the form of one or more processors (e.g., logic circuits), for executing program instructions. For example, the processor 220 may include interface circuits and processing circuits therein. The interface circuits may be configured to receive electronic signals from a bus 210, wherein the electronic signals encode structured data and/or instructions for the processing circuits to process. The processing circuits may conduct logic calculations, and then determine a conclusion, a result, and/or an instruction encoded as electronic signals. Then the interface circuits may send out the electronic signals from the processing circuits via the bus 210.

The computing device 200 may further include program storage and data storage of different forms including, for example, a disk 270, and a read-only memory (ROM) 230, or a random-access memory (RAM) 240, for storing various data files to be processed and/or transmitted by the computing device 200. The computing device 200 may also include program instructions stored in the ROM 230, RAM 240, and/or another type of non-transitory storage medium to be executed by the processor 220. The methods and/or processes of the present disclosure may be implemented as the program instructions. The computing device 200 may also include an I/O component 260, supporting input/output between the computer and other components. The computing device 200 may also receive programming and data via network communications.

Merely for illustration, only one processor is illustrated in FIG. 2. Multiple processors 220 are also contemplated; thus, operations and/or method steps performed by one processor 220 as described in the present disclosure may also be jointly or separately performed by the multiple processors. For example, if in the present disclosure the processor 220 of the computing device 200 executes both step A and step B, it should be understood that step A and step B may also be performed by two different processors 220 jointly or separately in the computing device 200 (e.g., a first processor executes step A and a second processor executes step B, or the first and second processors jointly execute steps A and B).

Figure 3:
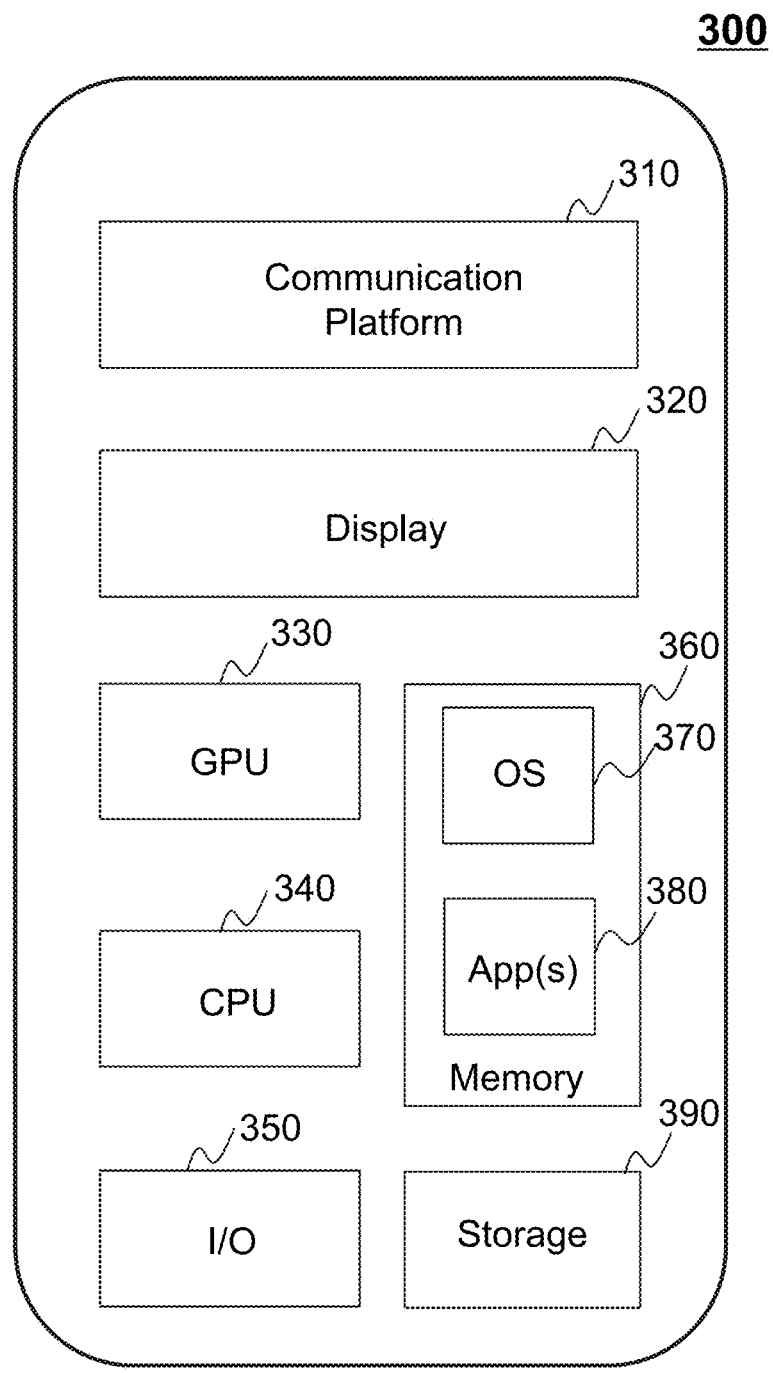
FIG. 3 is a schematic diagram illustrating exemplary hardware and/or software components of an exemplary terminal device according to some embodiments of the present disclosure.

FIG. 3 is a schematic diagram illustrating exemplary hardware and/or software components of an exemplary terminal device according to some embodiments of the present disclosure. In some embodiments, the user device 140 may be implemented on the terminal device 300 shown in FIG. 3. As illustrated in FIG. 3, the terminal device 300 may include a communication platform 310, a display 320, a graphic processing unit (GPU) 330, a central processing unit (CPU) 340, an I/O 350, a memory 360, and a storage 390. In some embodiments, any other suitable component, including but not limited to a system bus or a controller (not shown), may also be included in the terminal device 300.

In some embodiments, an operating system 370 (e.g., iOS™, Android™, Windows Phone™, etc.) and one or more Apps (applications) 380 may be loaded into the memory 360 from the storage 390 in order to be executed by the CPU 340. User interactions may be achieved via the I/O 350 and provided to the server 110 and/or other components of the security monitoring system 100 via the network 120. The terminal device 300 may transmit/receive data related to the image to be processed via the communication platform 310.

Figure 4:
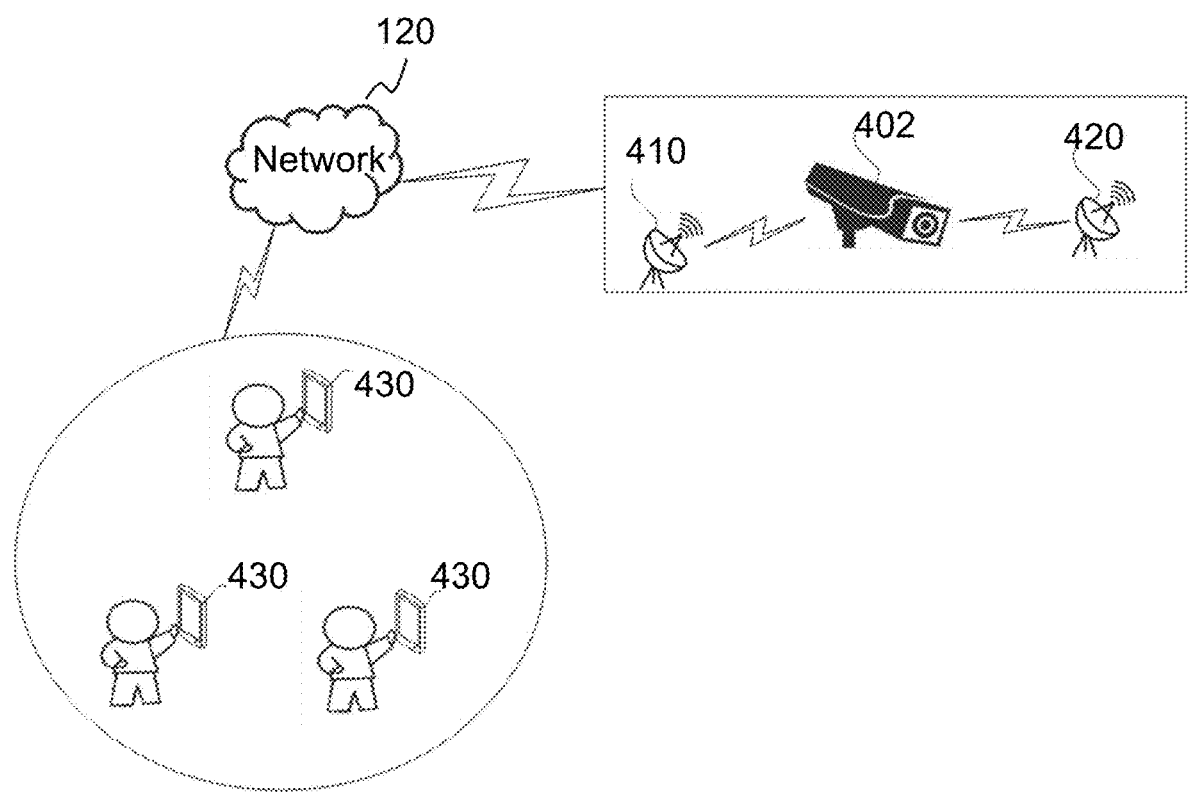
FIG. 4 is a schematic diagram illustrating an exemplary application scenario for identifying a target object located in a target region according to some embodiments of the present disclosure.

FIG. 4 is a schematic diagram illustrating an exemplary application scenario for identifying a target object located in a target region according to some embodiments of the present disclosure. For convenience, a camera 402 is described as an example and the target region corresponds to a capture area of the camera 402. As illustrated, a first antenna 410 and a second antenna 420 are placed around the camera 402. Target object(s) located in the target region can be identified from at least one candidate object 430 based on a first signal detected by the first antenna 410 and a second signal detected by the second antenna 420. Each of the at least one candidate object 430 can be any terminal device (e.g., a mobile phone, a wearable device, a desktop computer, a tablet computer) with a wireless communication function (e.g., a Wi-Fi function, a Bluetooth function), and when the terminal device activates the wireless communication function, the first antenna 410 and/or the second antenna 420 can detect identification information (e.g., a Medium Access Control (MAC) address, an Internet protocol (IP) address, an International Mobile Equipment Identity (IMEI)) associated with the terminal device.

In some embodiments, the first antenna 410 may be a directional antenna and the second antenna 420 may be an omnidirectional antenna. An acquisition region (also referred to as a "first acquisition region") of the first antenna 410 may include the target region (which corresponds to the capture area) and a non-target region (which corresponds to a non-capture area). An acquisition region (also referred to as a "second acquisition region") of the second antenna 420 may cover an area of the acquisition region of the first antenna 410 that does not overlap with the capture area. The acquisition region of the second antenna 420 may include a portion of the capture area and a portion of the non-capture area. In some embodiments, a receiving parameter (also referred to as a "first antenna parameter") of the first antenna 410 may be different from a receiving parameter (also referred to as a "second antenna parameter") of the second antenna 420.

When a first signal associated with the at least one candidate object 430 is received through the first antenna 410, and if a second signal associated with the at least one candidate object 430 is also received through the second antenna 420, one or more objects in the capture area (also referred to as "target object(s) located in the target region") may be identified from the at least one candidate object 430 based on a receiving parameter (also referred to as a "first parameter") of the first signal and a receiving parameter (also referred to as a "second parameter") of the second signal.

It should be noted that the application scenario described in the present disclosure is merely shown for ease of understanding the spirit and principles of the present disclosure, and not intended to be limiting. Rather, the embodiments of the present disclosure may be applied to any applicable scenario. For example, other than the camera 410, the acquisition device 130 may be other devices, such as an infrared sensor, a sound sensor, a radar, etc. Accordingly, the target region may correspond to an acquisition region of the infrared sensor, an acquisition region of the sound sensor, an acquisition region of the radar, etc.

Figure 5:
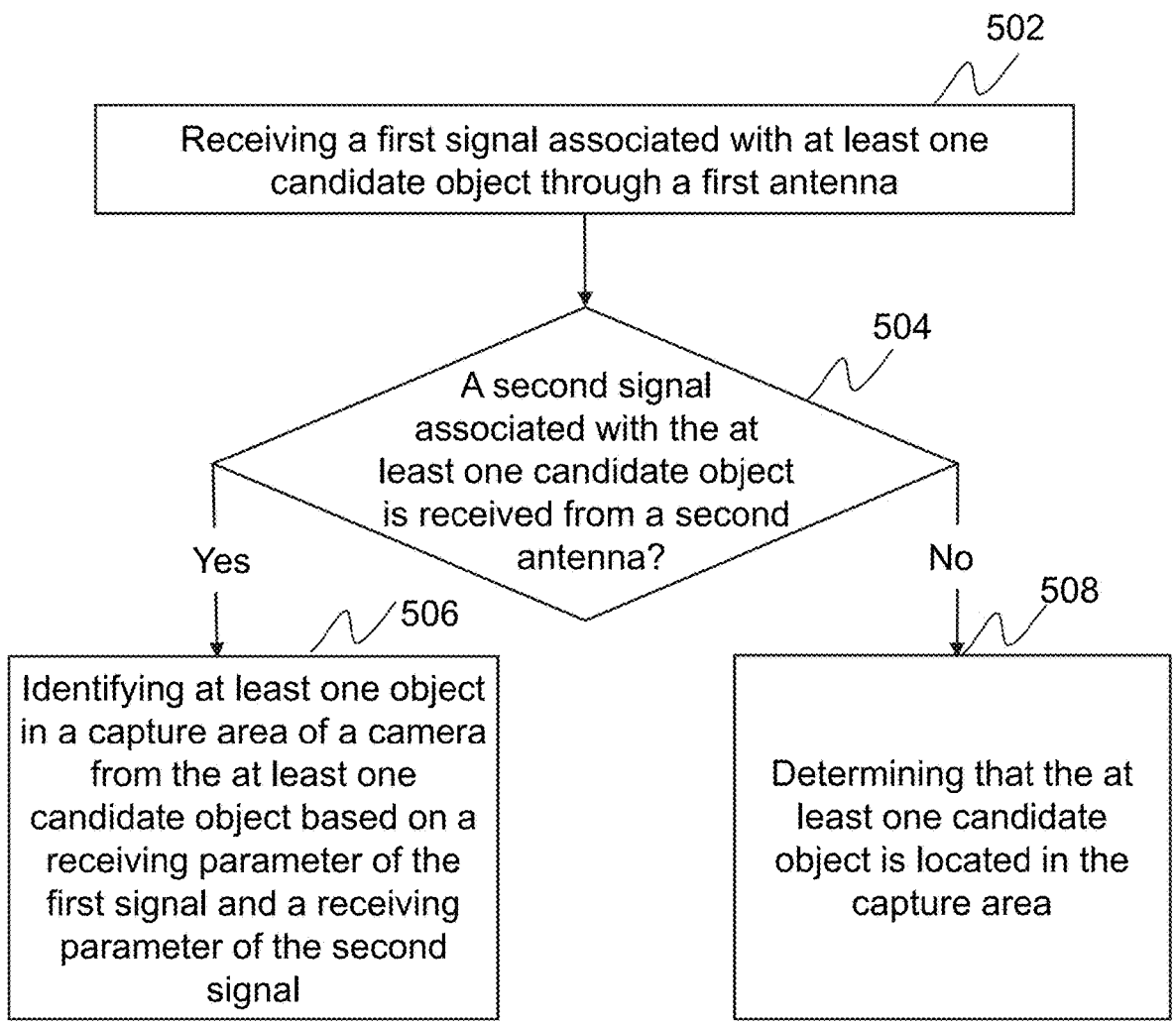
FIG. 5 is a flowchart illustrating an exemplary process for identifying a target object located in a target region according to some embodiments of the present disclosure.

FIG. 5 is a flowchart illustrating an exemplary process for identifying a target object located in a target region according to some embodiments of the present disclosure. In some embodiments, the process 500 may be executed by the security monitoring system 100. For example, the process 500 may be implemented as a set of instructions (e.g., an application) stored in the storage ROM 230 or RAM 240. The processor 220 and/or modules in FIG. 9 may execute the set of instructions, and when executing the instructions, the processor 220 and/or the modules may be configured to perform the process 500. The operations of the illustrated process 500 presented below are intended to be illustrative. In some embodiments, the process 500 may be accomplished with one or more additional operations not described, and/or without one or more of the operations discussed. Additionally, the order in which the operations of the process 500 as illustrated in FIG. 5 and described below is not intended to be limiting.

In 502, a first signal associated with at least one candidate object may be received through a first antenna.

In 504, whether a second signal associated with the at least one candidate object is received through a second antenna may be determined. In response to determining that the second signal associated with the at least one candidate object is received through the second antenna, operation 506 may be executed; in response to determining that no second signal associated with the at least one candidate object is received through the second antenna, operation 508 may be executed.

In 506, at least one object (i.e., target object) in the capture area (i.e., located in the target region) may be identified from the at least one candidate object based on a receiving parameter of the first signal and a receiving parameter of the second signal.

In 508, the at least one candidate object may be identified as object(s) in the capture area.

The process 500 may be implemented on a camera with an information processing function. Alternatively or additionally, the process 500 may be applied to a back-end server (e.g., the server 110) that communicates with the camera, the first antenna, and the second antenna. For example, operation 502 may be performed by the receiving module 910 and operations 504-508 may be performed by the identification module 920. Alternatively or additionally, the process 500 may be implemented in a specially set central control center. The systems and devices for implementing the process 500 are not all listed herein, and are not limited by the embodiments of the present disclosure.

In some embodiments of the present disclosure, a capture range of the camera may be referred to as the capture area.

AN area outside the capture range of the camera can be referred to as the non-capture area. As described above, the acquisition region of the first antenna may include the capture area and the non-capture area of the camera.

Figure 6:
FIG. 6 is a schematic diagram illustrating an acquisition region of an exemplary directional antenna according to some embodiments of the present disclosure.

FIG. 6 is a schematic diagram illustrating an acquisition region of an exemplary directional antenna according to some embodiments of the present disclosure. As shown in FIG. 6, the first antenna 410 may be a directional antenna. The directional antenna may include a maim lobe 610, one or more side lobes 620, and a back lobe 630 (the side lobe and the back lobe can be collectively referred to as "non-main lobe"). A propagation of the main lobe 610 may be directed towards the capture area and propagation of the non-main lobes may be directed towards the non-capture area.

Figure 7:
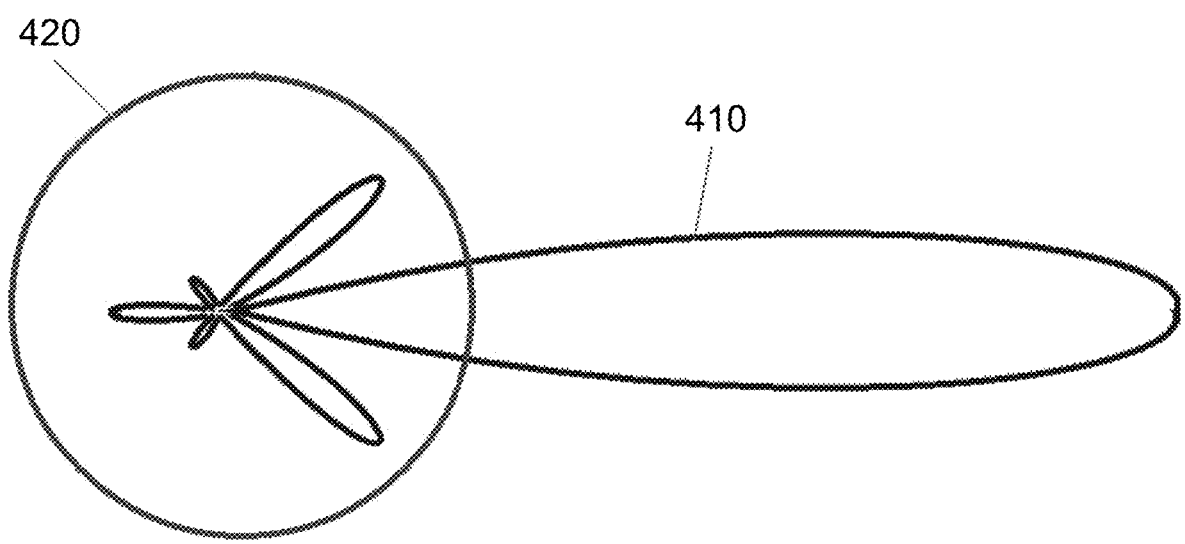
FIG. 7 is a schematic diagram illustrating an acquisition region of an exemplary directional antenna and an acquisition region of an exemplary omnidirectional antenna according to some embodiments of the present disclosure.

FIG. 7 is a schematic diagram illustrating an acquisition region of an exemplary directional antenna and an acquisition region of an exemplary omnidirectional antenna according to some embodiments of the present disclosure. As shown in FIG. 7, the first antenna 410 may be a directional antenna and the second antenna 420 may be an omnidirectional antenna. When the first antenna 410 and the second antenna 420 are jointly used with a camera, the acquisition region of the second antenna 420 may include acquisition regions of the side lobes and the back lobe of the directional antenna, that is, a portion of the non-capture area and a portion of the capture area. In some embodiments, a receiving parameter (also referred to as a "main lobe parameter") of the main lobe of the first antenna 410, receiving parameters (also referred to as "non-main lobe parameter") of the non-main lobes, and a receiving parameter of the second antenna 420 may be different from each other.

As described in connection with operation 502, when the at least one candidate object (e.g., a mobile phone) around the camera has activated a Wi-Fi function, the first signal associated with the at least one candidate object can be received through the first antenna. In the present disclosure, for the at least one candidate object, a singular "first signal" is used for convenience, an ordinary person in the art would understand that each of the at least one candidate object corresponds to a corresponding first signal. For each of the at least one candidate object, the first signal may carry (or include) identification information (e.g., a MAC address) of the candidate object. For example, when there is only one candidate object (e.g., an object 1) around the camera and the object 1 has activated the Wi-Fi function, the first signal associated with the object 1 can be received through the first antenna and the first signal associated with the object 1 may carry the MAC address of the object 1, which can be referred to as MAC address 1 for convenience. When there are four candidate objects (e.g., an object 1, an object 2, an object 3, and an object 4) around the camera and all the four objects have activated the Wi-Fi function, the first signals associated with the object 1, the object 2, the object 3, and the object 4 may be respectively received through the first antenna. The first signal associated with the object 1 may carry the MAC address 1 of the object 1. The first signal associated with the object 2 may carry a MAC address 2 of the object 2. The first signal associated with the object 3 may carry a MAC address 3 of the object 3. The first signal associated with the object 4 may carry a MAC address 4 of the object 4.

In some embodiments of the present disclosure, when the first signal associated with the at least one candidate object is received through the first antenna, whether a second signal associated with the at least one candidate object is received through the second antenna may be determined. In some embodiments of the present disclosure, since the receiving parameter of the main lobe of the first antenna, the receiving parameters of the non-main lobes of the first antenna, and the receiving parameter of the second antenna may be different from each other, for a specific object, if signals associated with the specific object are received through the first antenna and the second antenna respectively, a receiving parameter of the signal associated with the specific object received through the first antenna may be different from a receiving parameter of the signal associated with the specific object received through the second antenna. That is, for a same object, the first signal received through the first antenna and the second signal received through the second antenna may be a physically same signal sent by the object.

In some embodiments, the receiving parameter may include a received signal power, a received signal amplitude, a received signal intensity, a signal arrival angle, a signal arrival phase, or the like, or a combination thereof. In some embodiments, the receiving parameter may also include new parameters converted from the above mentioned parameters, such as a received signal intensity indicator (RSSI), a signal quality, etc.

In some embodiments of the present disclosure, the "received power" is described as an example, and the process for identifying a target object located in the target region is further described under an assumption that the received power of the second antenna is less than the received power of the main lobe of the first antenna and greater than the received power of the non-main lobes of the first antenna.

In some embodiments of the present disclosure, if it is determined that the second signal associated with the at least one candidate object is received through the second antenna, that is, when the first signal associated with the at least one candidate object is received through the first antenna, and the second signal associated with the at least one candidate object is also received through the second antenna, operation 506 may be performed. That is, object(s) in the capture area may be identified from the at least one candidate object based on the first signal associated with the at least one candidate object and the second signal associated with the at least one candidate object. A specific determination process is described below.

For a specific object, the received power of the first signal associated with the specific object may be compared with the received power of the second signal associated with the specific object. If the received power of the first signal associated with the specific object is greater than the received power of the second signal associated with the specific object, the specific object may be determined as an object in the capture area. Such operations may be repeated until all the objects in the capture area (i.e., the target region) are identified from the at least one candidate object.

That is, in some embodiments of the present disclosure, if the second signal associated with the at least one candidate object is also received through the second antenna, the first signal and the second signal associated with each of the at least one candidate object may be compared. As described above, also take a scenario in which the object 1, the object 2, the object 3, and the object 4 are around the camera as an example. For convenience, the first signal associated with the object 1 received through the first antenna is referred to as signal 11 and the signal 11 may carry the MAC address 1 of the object 1; the first signal associated with the object 2 received through the first antenna is referred to as signal 12 and the signal 12 may carry the MAC address 2 of the object 2; the first signal associated with the object 3 received through the first antenna is referred to as signal 13 and the signal 13 may carry the MAC address 3 of object 3; the first signal associated with the object 4 received through the first antenna is referred to as signal 14 and the signal 14 may carry the MAC address 4 of the object 4.

The second signal associated with the object 1 received through the second antenna is referred to as signal 21 and the signal 21 may carry the MAC address 1 of the object 1; the second signal associated with the object 2 received through the second antenna is referred to as signal 22 and the signal 22 may carry the MAC address 2 of the object 2; the second signal associated with the object 3 received through the second antenna is referred to as signal 23 and the signal 23 may carry the MAC address 3 of the object 3; the second signal associated with the object 4 received through the second antenna is referred to as signal 24 and the signal 24 may carry the MAC address 4 of the object 4.

Figure 8:
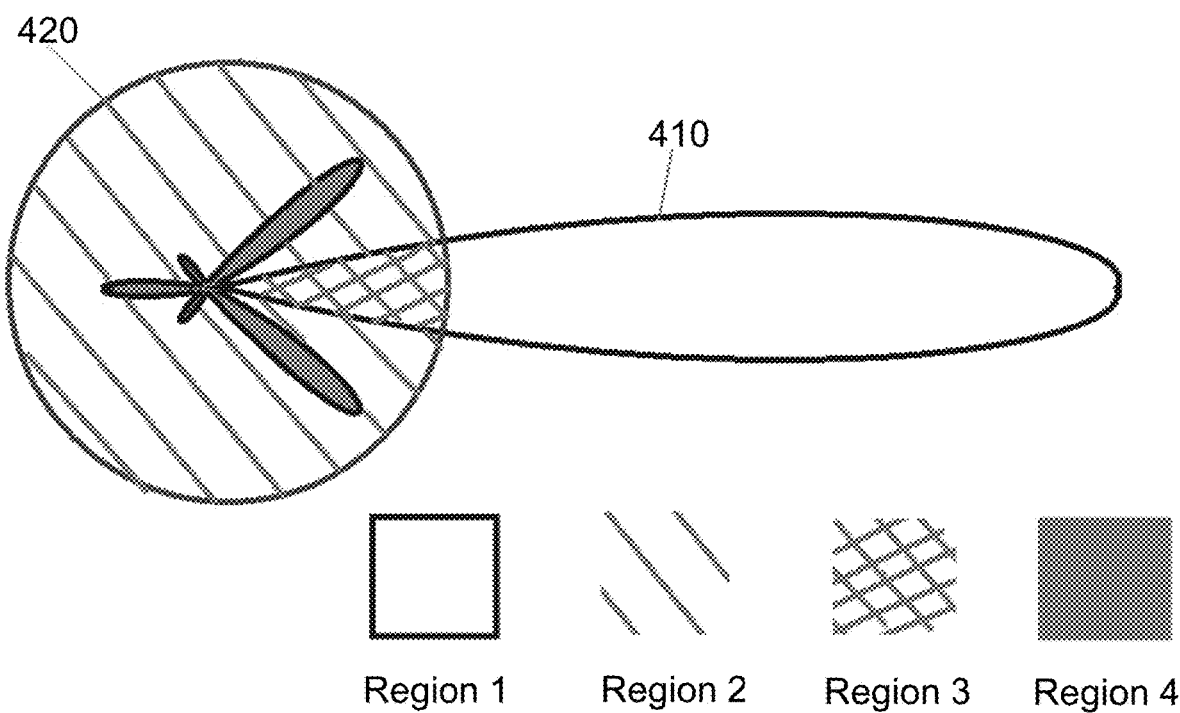
FIG. 8 is a schematic diagram illustrating exemplary regions associated with an acquisition region of a directional antenna and an acquisition region of an omnidirectional antenna according to some embodiments of the present disclosure.

FIG. 8 is a schematic diagram illustrating exemplary regions associated with an acquisition region of a directional antenna and an acquisition region of an omnidirectional antenna according to some embodiments of the present disclosure. In some embodiments, the first antenna 410 may be a directional antenna and the second antenna 420 may be an omnidirectional antenna. As shown in FIG. 8, a region 1 is a region which belongs to the capture area in the acquisition region of the first antenna 410, and the acquisition region of the second antenna 420 does not include the region 1; a region 2 is a region which belongs to the non-capture area in the acquisition region of the second antenna 420; a region 3 is a region which belongs to the capture area in an overlapping area of the acquisition region of the first antenna 410 and the acquisition region of the second antenna 420; a region 4 is a region which belongs to the non-capture area in the overlapping area of the acquisition region of the first antenna 410 and the acquisition region of the second antenna 420.

In some embodiments of the present disclosure, a first signal and a second signal associated with a same object may be determined based on the MAC addresses carried by the signals. For example, the signal 11 may carry the MAC address 1 and the signal 21 may carry the MAC address 1, which indicates that the signal 11 and the signal 21 may be signals associated with the same object 1 received through the first antenna and the second antenna, respectively.

For the object 1, since the signal 11 associated with the object 1 is received through the first antenna and the signal 21 associated with the object 1 is received through the second antenna, it indicates that the object 1 may be located in the region 3 or the region 4, that is, in the overlapping area of the acquisition region of the first antenna and the acquisition region of the second antenna. In this case, a received power of the first signal 11 may be compared with a received power of the signal 21. Since the received power of the second antenna is less than the received power of the main lobe of the first antenna and is greater than the received power of the non-main lobes of the first antenna, if the received power of the signal 11 is greater than the received power of the signal 21, it indicates that the object 1 may be located in the region 3, that is, located in the region that belongs to the capture area in the overlapping area of the acquisition region of the first antenna and the acquisition region of the second antenna. In this case, it may be determined that the object 1 is an object in the capture area. If the received power of the signal 11 is less than the received power of the signal 21, it indicates that the object 1 may be located in the region 4, that is, located in the region that belongs to the overlapping area of the acquisition region of the first antenna and the acquisition region of the second antenna. In this case, it may be determined that the object 1 is not an object in the capture area.

For the object 2, since the signal 12 associated with the object 2 is received through the first antenna and the signal 22 associated with the object 2 is received through the second antenna, it indicates that the object 2 may be located in the region 3 or the region 4, that is, in the overlapping area of the acquisition region of the first antenna and the acquisition region of the second antenna. In this case, the received power of the first signal associated with the object 2 (i.e., the signal 12) may be compared with the received power of the second signal associated with the object 2 (i.e., the signal 22). If the received power of the signal 12 is greater than the received power of the signal 22, it indicates that the object 2 may be located in the region 3, that is, located in the region that belongs to the capture area in the overlapping area of the acquisition region of the first antenna and the acquisition region of the second antenna. In this case, it may be determined that the object 2 is an object in the capture area. If the received power of the signal 12 is less than the received power of the signal 22, it indicates that the object 2 may be located in the region 4, that is, located in the region that belongs to the non-capture area in the overlapping area of the acquisition region of the first antenna and the acquisition region of the second antenna. In this case, it may be determined that the object 2 is not an object in the capture area.

For the object 3, since the signal 13 associated with the object 3 is received through the first antenna and the signal 23 associated with the object 3 is received through the second antenna, it indicates that object 3 may be located in the region 3 or the region 4, that is, in the overlapping area of the first antenna and the second antenna. In this case, the received power of the first signal associated with the object 3 (i.e., the signal 13) may be compared with the received power of the second signal associated with the object 3 (i.e., the signal 23). If the received power of the signal 13 is greater than the received power of the signal 23, it indicates that the object 3 may be located in the region 3, that is, located in the region that belongs to the capture area in the overlapping area of the acquisition region of the first antenna and the acquisition region of the second antenna. If the received power of the signal 13 is less than the received power of the signal 23, it indicates that the object 3 may be located in the region 4, that is, located in the region that belongs to the non-capture area in the overlapping area of the acquisition region of the first antenna and the acquisition region of the second antenna. In this case, it may be determined that the object 3 is not an object in the capture area.

For the object 4, since the signal 14 associated with the object 4 is received through the first antenna and the signal 24 associated with the object 4 is received through the second antenna, it indicates that the object 4 may be located in the region 3 or the region 4, that is, located in the overlapping area of the acquisition region of the first antenna and the acquisition region of the second antenna. In this case, the received power of the first signal associated with the object 4 (i.e., the signal 14) may be compared with the received power of the second signal associated with the object 4 (i.e., the signal 24). If the received power of the signal 14 is greater than the received power of the signal 24, it indicates that the object 4 may be located in the region 3, that is, located in the region that belongs to the capture area in the overlapping area of the acquisition region of the first antenna and the acquisition region of the second antenna. In this case, it may be determined that the object 4 is an object in the capture area. If the received power of the signal 14 is less than the received power of the signal 24, it indicates that the object 4 may be located in the region 4, that is, located in a region that belongs to a non-capture area in the overlapping area of the acquisition region of the first antenna and the acquisition region of the second antenna. In this case, it may be determined that the object 4 is not an object in the object in the capture area.

In some embodiments of the present disclosure, if it is determined that no second signal associated with the at least one candidate object is received through the second antenna, that is, when the first signal associated with the at least one candidate object is received through the first antenna and no second signal associated with the at least one candidate object is received through the second antenna, operation 508 may be performed, that is, determining that the at least one candidate object is in the capture area.

As described in connection with FIG. 8, in some embodiments of the present disclosure, since the acquisition region of the second antenna includes the acquisition regions of the side lobes and the back lobe of the first antenna, if the first signal associated with the at least one candidate object is received through the first antenna and no second signal associated with the at least one candidate object is received through the second antenna, it indicates that the at least one candidate object is detected in the acquisition region of the main lobe of the first antenna. As illustrated, the acquisition region of the main lobe of the first antenna belongs to the capture area, that is, the region 1. Therefore, when the first signal associated with the at least one candidate object is received through the first antenna and no second signal associated with the at least one antenna is received through the second antenna, it may be determined that the at least one candidate object is in the capture area.

As described above, also take a scenario in which the object 1, the object 2, the object 3, and the object 4 are around the camera as an example. If the first signal associated with the object 1 (i.e., the signal 11), the first signal associated with the object 2 (i.e., the signal 12), the first signal associated with the object 3 (i.e., the signal 13), and the first signal associated with the object 4 (i.e., the signal 14) are received through the first antenna, and no second signal associated with the object 1, the object 2, the object 3, and the object 4 is received through the second antenna, it may be determined that all the object 1, the object 2, the object 3, and the object 4 are in the capture area.

In actual applications, there may be a situation in which second signals associated with the object 1, the object 2, the object 3, and the object 4 are received through the second antenna, while no first signal associated with the object 1, the object 2, the object 3, and the object 4 is received through the first antenna, it indicates that the object 1, the object 2, the object 3, and the object 4 are in a region that does not overlap with the first acquisition region in the second acquisition region, that is, the region 2. It may be determined that all the object 1, the object 2, the object 3, and the object 4 are not in the capture area.

According to the above process, a first antenna and a second antenna with different receiving parameters may be jointly used with a camera, and an acquisition region of the first antenna may include a capture area and a non-capture area of the camera, while an acquisition region of the second antenna may include a portion of the non-capture area and a portion of the capture area. When a first signal associated with at least one candidate object is received through the first antenna, if a second signal associated with the at least one candidate object is received through the second antenna, then an object (i.e., a target object) in the capture area may be identified from the at least one candidate object based on a receiving parameter of the first signal and a receiving parameter of the second signal. Therefore, the accuracy of identifying the object(s) in the capture area from the objects detected by the antennas may be improved.

It should be noted that, according to some embodiments of the present disclosure, other than the received power, other receiving parameters may be used to identify the target object(s), such as a received signal amplitude, a received signal intensity, a signal arrival angle, a signal arrival phase, etc.

In some embodiments, when the received signal amplitude is used, and when a first signal associated with the at least one candidate object is received through the first antenna, if a second signal associated with the at least one candidate object is received through the second antenna, object(s) in the capture area may be identified from the at least one candidate object based on the received signal amplitude of the first signal and the received signal amplitude of the second signal. The acquisition region of the first antenna may include a capture area and a non-capture area of the camera, and the acquisition region of the second antenna may include the non-capture area. The received signal amplitude of the second antenna may be different from the received signal amplitude of the first antenna, and the relevant description is not repeated here.

According to the same inventive concept, some embodiments of the present disclosure provide a system for identifying object(s) in the capture area. The specific implementation of the method for identifying the object(s) in the capture area by the system can be found in the description of the above method, for example, in the description in connection with FIG. 5, and such description is not repeated here.

The system may include a first antenna, a second antenna, and a camera.

When a first signal associated with at least one candidate object is received through the first antenna, if a second signal associated with the at least one candidate object is received through the second antenna, object(s) in the capture area may be identified from the at least one candidate object based on a receiving parameter of the first signal and a receiving parameter of the second signal.

An acquisition region of the first antenna may include a capture area and a non-capture area of the camera, and an acquisition region of the second antenna may include the non-capture area. A receiving parameter of the second antenna may be different from a receiving parameter of the first antenna.

Optionally, a propagation of a main lobe of the first antenna may be directed towards the capture area and a propagation of non-main lobes of the first antenna may be directed towards the non-capture area. The receiving parameter of the main lobe, the receiving parameters of the non-main lobes, and the receiving parameter of the second antenna may be different from each other.

Optionally, the receiving parameter may include a received signal power, a received signal amplitude, a received signal intensity, a signal arrival angle, a signal arrival phase, or the like, or a combination thereof.

Optionally, when the receiving parameter is "received power", and when the received power of the second antenna is less than the received power of the main lobe and is greater than the received power of the non-main lobes, the system may be further configured to execute the following process.

For a specific object, the received power of the first signal associated with the specific object may be compared with the received power of the second signal associated with the specific object. If the received power of the first signal associated with the specific object is greater than the received power of the second signal associated with the specific object, the specific object may be determined as an object in the capture area. Such operations may be repeated until all the objects in the capture area (i.e., the target region) are identified from the at least one candidate object.

Optionally, if no second signal associated with the at least one candidate object is received through the second antenna, it may be determined that the at least one candidate object is in the capture area.

Optionally, the first antenna may be a directional antenna and the second antenna may be an omnidirectional antenna.

According to the same inventive concept, some embodiments of the present disclosure provide a device for identifying object(s) in the capture area is. The specific implementation of the method for identifying the object(s) in the capture area by the device can be found in the description of the above method, for example, in the description in connection with FIG. 5, and such description is not repeated here.

The device may include a first antenna, a second antenna, and a camera, as described in the some embodiments of the present disclosure.

It should be noted that the above description is merely provided for the purposes of illustration, and not intended to limit the scope of the present disclosure. For persons having ordinary skill in the art, multiple variations and modifications may be made under the teachings of the present disclosure. However, those variations and modifications do not depart from the scope of the present disclosure.

Figure 9:
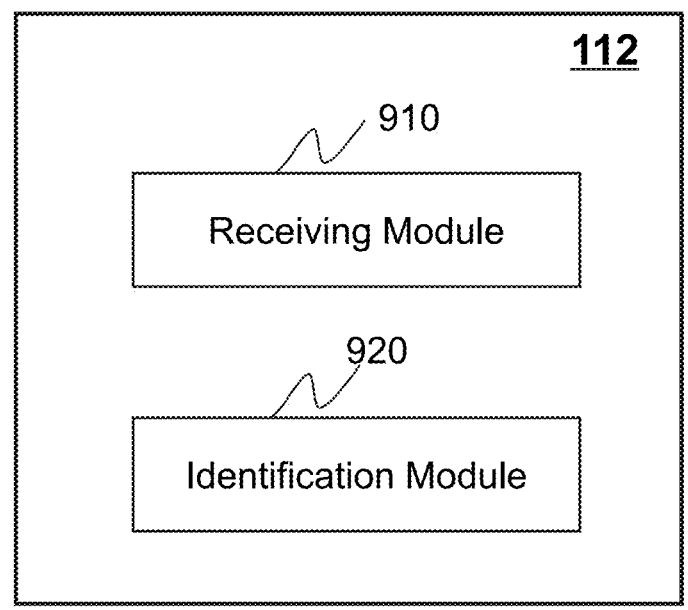
FIG. 9 is a block diagram illustrating an exemplary processing engine according to some embodiments of the present disclosure.

FIG. 9 is a block diagram illustrating an exemplary processing engine according to some embodiments of the present disclosure. The processing engine 112 may include a receiving module 910 an identification module 920.

The receiving module 410 may be configured to receive a first signal associated with at least one candidate object from a first antenna and a second signal associated with the at least one candidate object from a second antenna. More descriptions of the first antenna and/or the second antenna may be found elsewhere in the present disclosure (e.g., FIG. 10 and the description thereof).

The identification module 920 may be configured to identify a target object from the at least one candidate object based on the first signal and the second signal. For example, the identification module 920 may identify the target object located in the target region from the at least one candidate object by comparing a first parameter determined from the first signal with a second parameter determined from the second signal. In some embodiments, the first parameter may include a first signal power, a first signal amplitude, a first signal intensity, a first signal arrival angle, a first signal arrival phase, etc.; the second parameter may include a second signal power, second signal amplitude, a second signal intensity, a second signal arrival angle, a second signal arrival phase, etc. More descriptions may be found elsewhere in the present disclosure (e.g., FIG. 10 and the description thereof).

In some embodiments, the processing engine 112 may also include a the transmission module (not shown) configured to transmit information and/or data associated with the target object to other components of the security monitoring system 100 or an external device.

The modules in FIG. 9 may be connected to or communicate with each other via a wired connection or a wireless connection. The wired connection may include a metal cable, an optical cable, a hybrid cable, or the like, or a combination thereof. The wireless connection may include a Local Area Network (LAN), a Wide Area Network (WAN), a Bluetooth, a ZigBee, a Near Field Communication (NFC), or the like, or a combination thereof. In some embodiments, two or more of the modules may be combined into a single module, and any one of the modules may be divided into two or more units. In some embodiments, one or more of the modules may be omitted. For example, the processing engine 112 may include a storage module (not shown) configured to store information and/or data (e.g., the first signal, the second signal, the first parameter, the second parameter) associated with the at least one candidate object. As another example, the receiving module 910 may be divided into a first receiving unit configured to receive the first signal and a second receiving unit configured to receive the second signal.

Figure 10:
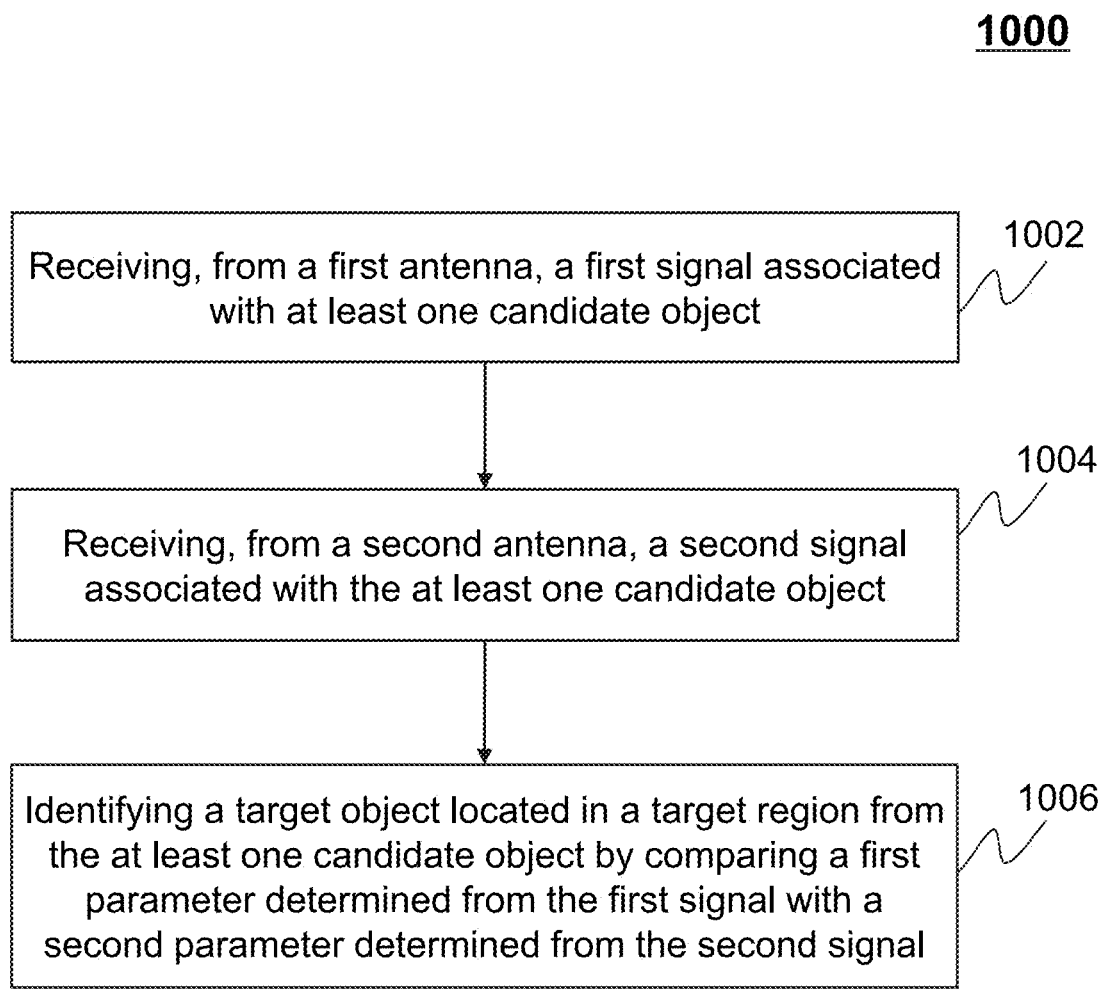
FIG. 10 is a flowchart illustrating an exemplary process for identifying a target object located in a target region according to some embodiments of the present disclosure.

FIG. 10 is a flowchart illustrating an exemplary process for identifying a target object located in a target region according to some embodiments of the present disclosure. In some embodiments, the process 1000 may be executed by the security monitoring system 100. For example, the process 1000 may be implemented as a set of instructions (e.g., an application) stored in the storage ROM 230 or RAM 240. The processor 220 and/or modules in FIG. 9 may execute the set of instructions, and when executing the instructions, the processor 220 and/or the modules may be configured to perform the process 1000. The operations of the illustrated process 1000 presented below are intended to be illustrative. In some embodiments, the process 1000 may be accomplished with one or more additional operations not described, and/or without one or more of the operations discussed. Additionally, the order in which the operations of the process 1000 as illustrated in FIG. 10 and described below is not intended to be limiting.

In 1002, the processing engine 112 (e.g., the receiving module 910) may receive, from a first antenna, a first signal associated with at least one candidate object. As described in connection with FIG. 4, the "candidate object" may be a terminal device with a wireless communication function (e.g., a Wi-Fi function, a Bluetooth function). In some embodiments, the at least one candidate object may include a mobile phone, a wearable device, a desktop computer, a tablet computer, etc.

As described elsewhere in the present disclosure, the first antenna may be associated with a first acquisition region. When an object is located in the first acquisition region and the wireless communication function of the object is activated, the first antenna may detect a first signal associated with the object.

In some embodiments, the first acquisition region may include a target region and a non-target region. As used herein, the target region may be a region of interest that the security monitoring system 100 is monitoring. In some embodiments, as described in connection with FIG. 4, the target region may correspond to a capture area of a camera which is jointly used with the first antenna.

In some embodiments, the first antenna may be a directional antenna including a main lobe and one or more non-main lobes (e.g., one or more side lobes 620 and/or one or more back lobes 630 illustrated in FIG. 6). Accordingly, the first acquisition region may include an acquisition region corresponding to the main lobe and one or more acquisition regions corresponding to the one or more non-main lobes. In some embodiments, a propagation of the main lobe may be directed towards the target region and a propagation of the one or more non-main lobes may be directed towards the non-target region. Accordingly, the acquisition region corresponding to the main lobe may include the target region and the acquisition region corresponding to the non-main lobes may include the non-target region.

In some embodiments, the first antenna may be associated with a first antenna parameter. As used herein, an "antenna parameter" may be a parameter indicating a receiving capacity of an antenna. In some embodiments, the first antenna parameter may include a first received power, a first bandwidth, a first gain, a first effective area, a first radiation pattern, a first field region, a first efficiency, a first polarization, a first impedance matching, or the like, or any combination thereof. In some embodiments, the first antenna parameter may include a main lobe parameter corresponding to the main lobe and one or more non-main lobe parameters corresponding to the non-main lobes. Take the "received power" as an example, the first received power may include a main lobe received power corresponding to the main lobe and a non-main lobe received power corresponding to the one or more non-main lobes.

In 1004, the processing engine 112 (e.g., the receiving module 910) may receive, from a second antenna, a second signal associated with the at least one candidate object.

As described elsewhere in the present disclosure, the second antenna may be associated with a second acquisition region, wherein the second acquisition region may be different from the first acquisition region associated with the first antenna. Similar to the first antenna, when an object is located in the second acquisition region and the wireless communication function of the object is activated, the second antenna may detect a second signal associated with the object.

In some embodiments, the second acquisition region may partially overlap with the first acquisition region. For example, as illustrated in FIG. 7, the second acquisition region may include the non-target region and/or a portion of the target region.

In some embodiments, the second antenna may be an omnidirectional antenna. In some embodiments, the second antenna may be associated with a second antenna parameter. Similar to the first antenna parameter, the second antenna parameter may include a second received power, a second bandwidth, a second gain, a second effective area, a second radiation pattern, a second field region, a second efficiency, a second polarization, a second impedance matching, or the like, or any combination thereof. In some embodiments, the second antenna parameter may be different from the first antenna parameter. Specifically, the second antenna parameter, the main lobe parameter of the first antenna, and the one or more non-main lobe parameters of the first antenna are different from each other. Also take the "received power" as an example, the second received power may be less than the main lobe received power corresponding to the main lobe of the first antenna and larger than the non-main lobe received power corresponding to the one or more non-main lobes of the first antenna.

In 1006, the processing engine 112 (e.g., the identification module 920) may identify a target object located in the target region from the at least one candidate object by comparing a first parameter (also referred to as a "first signal parameter") determined from the first signal with a second parameter (also referred to as a "second signal parameter") determined from the second signal.

In some embodiments, the first parameter may include a first signal power, a first signal amplitude, a first signal intensity, a first signal arrival angle, a first signal arrival phase, etc.; the second parameter may include a second signal power, second signal amplitude, a second signal intensity, a second signal arrival angle, a second signal arrival phase, etc.

As described above, since the second antenna parameter associated with the second antenna is different from the first antenna parameter associated with the first antenna, for a specific candidate object, the second signal is different from the first signal. Accordingly, for the specific candidate object, the second parameter determined from the second signal is also different from the first parameter determined from the first signal.

Take antenna parameter "received power" and signal parameter "signal intensity" as an example, for each of the at least one candidate object, the processing engine 112 may compare the first signal intensity determined from the first signal with the second signal intensity determined from the second signal. As described above, since the second received power is less than the main lobe received power corresponding to the main lobe of the first antenna and larger than the non-main lobe received power corresponding to the one or more non-main lobes of the first antenna, in response to determining that the first signal intensity is greater than the second signal intensity, it may indicate that the candidate object is located in an acquisition region of the main lobe (a propagation of which is directed towards the target region), the processing engine 112 may identify the candidate object as a target object located in the target region. As illustrated in FIG. 8, it can be determined that the candidate object is located in the region 3.

In response to determining that the first signal intensity is less than or equal to the second signal intensity, the processing engine 112 may determine that the candidate object is not located in the target region. As illustrated in FIG. 8, it can be determined that the candidate object is located in the region 4.

In some embodiments, for a specific candidate object, if no second signal is received through the second antenna, the processing engine 112 may identify the candidate object as the target object located in the target region. As illustrated in FIG. 8, it can be determined that the candidate object is located in region 1.

In some embodiments, as described elsewhere in the present disclosure, for a specific object, the first signal and the second signal may include identification information (e.g., a MAC address) associated with the object. After identifying the target object(s), the processing engine 112 (e.g., the transmission module) may transmit information and/or data (e.g., the identification information, a time point when the first signal associated with the target object is acquired, a time point when the second signal associated with the target object is acquired) associated with the target object(s) to other components (e.g., the user device 140, the storage 150) of the security monitoring system 100 or an external device (e.g., a data resource).

In some embodiments, after identifying the target object (s) (e.g., a mobile phone), the processing engine 112 may further identify reference object(s) (e.g., a person who carries the mobile phone) correlated with the target object (s). Take a specific target object as an example, the processing engine 112 may identify a corresponding reference object based on a time point when the specific target object is detected by the first antenna or the second antenna and a time point when the reference object is detected by the camera.

It should be noted that the above description is merely provided for the purposes of illustration, and not intended to limit the scope of the present disclosure. For persons having ordinary skill in the art, multiple variations and modifications may be made under the teachings of the present disclosure. However, those variations and modifications do not depart from the scope of the present disclosure.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure, and are within the spirit and scope of the exemplary embodiments of this disclosure.

Moreover, certain terminology has been used to describe embodiments of the present disclosure. For example, the terms "one embodiment," "an embodiment," and/or "some embodiments" mean that a particular feature, structure or characteristic described in connection with the embodiment is included in at least one embodiment of the present disclosure. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the present disclosure.

Further, it will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "unit," "module," or "system." Furthermore, aspects of the present disclosure may take the form of a computer program product embodied in one or more computer readable media having computer-readable program code embodied thereon.

A computer readable signal medium may include a propagated data signal with computer readable program code embodied therein, for example, in baseband or as part of a carrier wave. Such a propagated signal may take any of a variety of forms, including electromagnetic, optical, or the like, or any suitable combination thereof. A computer readable signal medium may be any computer readable medium that is not a computer readable storage medium and that may communicate, propagate, or transport a program for use by or in connection with an instruction execution system, apparatus, or device. Program code embodied on a computer readable signal medium may be transmitted using any appropriate medium, including wireless, wireline, optical fiber cable, RF, or the like, or any suitable combination of the foregoing.

Computer program code for carrying out operations for aspects of the present disclosure may be written in a combination of one or more programming languages, including an object oriented programming language such as Java, Scala, Smalltalk, Eiffel, JADE, Emerald, C++, C #, VB. NET, Python or the like, conventional procedural programming languages, such as the "C" programming language, Visual Basic, Fortran 2003, Perl, COBOL 2002, PHP, ABAP, dynamic programming languages such as Python, Ruby, and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Furthermore, the recited order of processing elements or sequences, or the use of numbers, letters, or other designations thereof, are not intended to limit the claimed processes and methods to any order except as may be specified in the claims. Although the above disclosure discusses through various examples what is currently considered to be a variety of useful embodiments of the disclosure, it is to be understood that such detail is solely for that purpose, and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software only solution, e.g., an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various embodiments. This method of disclosure, however, is not to be interpreted as reflecting an intention that the claimed subject matter requires more features than are expressly recited in each claim. Rather, claimed subject matter may lie in less than all features of a single foregoing disclosed embodiment.

We claim:

1. A system for identifying a target object, comprising:
a storage device to store a set of instructions; and
a processor, communicatively coupled to the storage device, to execute the set of instructions to:
receive, from a first antenna, a first signal associated with at least one candidate object, wherein the first antenna is associated with a first acquisition region, the first antenna comprises a main lobe and one or more non-main lobes, the first antenna is associated with a first antenna parameter, and the first antenna parameter comprises a main lobe parameter corresponding to the main lobe and one or more non-main lobe parameters corresponding to the one or more non-main lobes;
receive, from a second antenna, a second signal associated with the at least one candidate object, wherein the second antenna is associated with a second acquisition region that is different from the first acquisition region, the second antenna is associated with a second antenna parameter, and the main lobe parameter, the one or more non-main lobe parameters, and the second antenna parameter are different from each other; and
identify a target object located in a target region from the at least one candidate object by comparing a first parameter determined from the first signal with a second parameter determined from the second signal.

2. The system of claim 1, wherein the target region corresponds to a capture area of a camera.

3. The system of claim 1, wherein the first acquisition region comprises the target region and a non-target region, and the second acquisition region comprises the non-target region.

4. The system of claim 3, wherein a propagation of the main lobe is directed towards the target region and propagation of the one or more non-main lobes is directed towards the non-target region.

5. The system of claim 1, wherein
the first antenna parameter comprises a first received power, the first received power comprising a main lobe received power corresponding to the main lobe and a non-main lobe received power corresponding to the one or more non-main lobes, and
the second antenna parameter comprises a second received power, the second received power being less than the main lobe received power and larger than the non-main received power.

6. The system of claim 5, wherein to identify the target object located in the target region from the at least one candidate object by comparing the first parameter determined from the first signal with the second parameter determined from the second signal, the processor is directed to:
for each of the at least one candidate object,
compare a first signal intensity of the first signal with a second signal intensity of the second signal; and
in response to determining that the first signal intensity is greater than the second signal intensity, identify the candidate object as the target object located in the target region.

7. The system of claim 1, wherein
the first parameter determined from the first signal comprises at least one of a first signal power, a first signal amplitude, a first signal intensity, a first signal arrival angle, or a first signal arrival phase; and
the second parameter determined from the second signal comprises at least one of a second signal power, a second signal amplitude, a second signal intensity, a second signal arrival angle, or a second signal arrival phase.

8. The system of claim 1, wherein the first antenna is a directional antenna and the second antenna is an omnidirectional antenna.

9. The system of claim 1, wherein the first signal and the second signal comprise identification information associated with the at least one candidate object.

10. A method for identifying a target object, implemented on a computing device including at least one processor and at least one storage medium, the method comprising:
receiving, from a first antenna, a first signal associated with at least one candidate object, wherein the first antenna is associated with a first acquisition region, the first antenna comprises a main lobe and one or more non-main lobes, the first antenna is associated with a first antenna parameter, and the first antenna parameter comprises a main lobe parameter corresponding to the main lobe and one or more non-main lobe parameters corresponding to the one or more non-main lobes;

receiving, from a second antenna, a second signal associated with the at least one candidate object, wherein the second antenna is associated with a second acquisition region that is different from the first acquisition region, the second antenna is associated with a second antenna parameter, and the main lobe parameter, the one or more non-main lobe parameters, and the second antenna parameter are different from each other; and identifying a target object located in a target region from the at least one candidate object by comparing a first parameter determined from the first signal with a second parameter determined from the second signal.

11. The method of claim 10, wherein the target region corresponds to a capture area of a camera.

12. The method of claim 10, wherein the first acquisition region comprises the target region and a non-target region, and the second acquisition region comprises the non-target region.

13. The method of claim 12, wherein a propagation of the main lobe is directed towards the target region and propagation of the one or more non-main lobes is directed towards the non-target region.

14. The method of claim 10, wherein
the first antenna parameter comprises a first received power, the first received power comprising a main lobe received power corresponding to the main lobe and a non-main lobe received power corresponding to the one or more non-main lobes, the second antenna parameter comprises a second received power, the second received power being less than the main lobe received power and larger than the non-main received power, and the identifying a target object located in a target region from the at least one candidate object by comparing a first parameter determined from the first signal with a second parameter determined from the second signal includes:

for each of the at least one candidate object,
comparing a first signal intensity of the first signal with a second signal intensity of the second signal; and in response to determining that the first signal intensity is greater than the second signal intensity, identifying the candidate object as the target object located in the target region.

15. The method of claim 10, wherein
the first parameter determined from the first signal comprises at least one of a first signal power, a first signal amplitude, a first signal intensity, a first signal arrival angle, or a first signal arrival phase; and the second parameter determined from the second signal comprises at least one of a second signal power, a second signal amplitude, a second signal intensity, a second signal arrival angle, or a second signal arrival phase.

16. The method of claim 10, wherein the first antenna is a directional antenna and the second antenna is an omnidirectional antenna.

17. The method of claim 10, wherein the first signal and the second signal comprise identification information associated with the at least one candidate object.

18. A non-transitory computer readable medium, comprising executable instructions that, when executed by at least one processor, direct the at least one processor to perform a method, the method comprising:

receiving, from a first antenna, a first signal associated with at least one candidate object, wherein the first antenna is associated with a first acquisition region, the first antenna comprises a main lobe and one or more non-main lobes, the first antenna is associated with a first antenna parameter, the first antenna parameter comprises a main lobe parameter corresponding to the main lobe and one or more non-main lobe parameters corresponding to the one or more non-main lobes;

receiving, from a second antenna, a second signal associated with the at least one candidate object, wherein the second antenna is associated with a second acquisition region that is different from the first acquisition region, the second antenna is associated with a second antenna parameter, and the main lobe parameter, the one or more non-main lobe parameters, and the second antenna parameter are different from each other; and identifying a target object located in a target region from the at least one candidate object by comparing a first parameter determined from the first signal with a second parameter determined from the second signal.

* * * * *